United States Patent [19]

Hille et al.

[11] Patent Number: 5,169,922
[45] Date of Patent: Dec. 8, 1992

[54] COATING COMPOSITIONS AND PROCESS FOR THE PREPARATION OF A MULTICOAT PROTECTIVE AND/OR DECORATIVE COATING ON A SUBSTRATE SURFACE

[75] Inventors: Hans-Dieter Hille, Bergisch-Gladbach; Arnold Dobbelstein, Munster; Horst Grosch, Leinach, all of Fed. Rep. of Germany

[73] Assignee: BASF Lacke + Farben AG, Münster, Fed. Rep. of Germany

[21] Appl. No.: 445,610

[22] PCT Filed: Jul. 19, 1988

[86] PCT No.: PCT/EP88/00650
§ 371 Date: Apr. 4, 1990
§ 102(e) Date: Apr. 4, 1990

[87] PCT Pub. No.: WO89/01004
PCT Pub. Date: Feb. 9, 1989

[30] Foreign Application Priority Data

Aug. 4, 1987 [DE] Fed. Rep. of Germany ....... 3725784

[51] Int. Cl.$^5$ .................. C08G 18/10; C08G 18/67
[52] U.S. Cl. ................................ 528/75; 528/49; 528/55; 528/65; 525/455; 524/457; 524/507
[58] Field of Search ........... 528/50, 49, 75, 55, 528/65; 525/455, 456; 521/107; 524/457, 507, 567

[56] References Cited

U.S. PATENT DOCUMENTS

| 4,097,439 | 6/1978 | Darling | 528/49 |
| 4,317,894 | 3/1982 | Lewarchik et al. | 525/455 |
| 5,011,881 | 4/1991 | Fujii et al. | 524/457 |

FOREIGN PATENT DOCUMENTS 0046088  2/1982  European Pat. Off. .

Primary Examiner—John Kight, III
Assistant Examiner—Duc Truong
Attorney, Agent, or Firm—Kenyon & Kenyon

[57] ABSTRACT

The invention relates to coating compositions which are particularly suitable for the preparation of the basecoat for two-coat coatings of the basecoat/clearcoat type, and which comprise organic diluents, at least one resin containing urethane and urea groups, and, where appropriate, other resins, pigments and other conventional additives in common use. The coating compositions according to the invention are those which comprise at least one resin containing urethane and urea groups, which resin is obtainable by reacting a1) a compound having two hydroxyl groups reactive toward isocyanate groups, with
a2) an aliphatic and/or cycloaliphatic di-isocyanate to form a prepolymer (A) containing isocyanate groups, and by subsequently reacting the isocyanate groups of the prepolymer (A), at least in part, with a3) an adduct produced from a (meth)acrylic ester, preferably an acrylic ester, and an aliphatic or cycloaliphatic compound containing at least two aminic hydrogen atoms, the adduct containing at least one active aminic hydrogen atom.

13 Claims, No Drawings

COATING COMPOSITIONS AND PROCESS FOR THE PREPARATION OF A MULTICOAT PROTECTIVE AND/OR DECORATIVE COATING ON A SUBSTRATE SURFACE

The invention relates to coating compositions which are particularly suitable for the preparation of the basecoat for two-coat coatings of the basecoat/clearcoat type, and which comprise organic diluents, at least one resin containing urethane and urea groups, and, where appropriate, other resins, pigments and other conventional additives in common use.

In the field of automotive finishing in particular, but also in other areas there is considerable interest in basecoat compositions for the preparation of multicoat coatings.

In automotive finishing, two-coat coatings of the basecoat/clearcoat type in particular have gained wide acceptance, especially for metallic finishes.

Basecoat/clearcoat coatings are prepared by first applying a pigmented basecoat which, after a brief flush-off period, is overcoated by a clearcoat without a baking stage (wet-on-wet process), the basecoat and clearcoat being subsequently baked together.

The coating compositions for the preparation of these basecoats must be capable of being processed by the expedient wet-on-wet process, in general use today, i.e. they must be capable, after an as short a drying time as possible without a baking stage, of being overcoated with a transparent topcoat, without the appearance of any defects due to solvent action of one coat on the other and of any "strike-in" phenomena.

In addition, other problems must be solved in the development of coating compositions for basecoats for metallic finishes. The metallic effect depends crucially on the orientation of the metallic pigment particles in the paint film. A basecoat for metallic finishes, capable of being processed by the wet-on-wet process, must therefore produce paint films in which the metallic pigments are present after the application in a suitable spatial orientation and in which this orientation becomes rapidly set in such a way that it cannot be disturbed in the course of further painting processes.

EP-A-137,256 discloses coating compositions for the preparation of the basecoat for two-coating coatings of the basecoat/clearcoat type which contain polyurethane elastomers and/or polyurea elastomers as binder components.

From the coating compositions disclosed in EP-A-137,256 it is possible to prepare two-coat coatings, in particular two-coat metallic coatings which possess a good metallic effect, good adhesion and excellent resistance to stone impact.

More recently, automotive manufacturers have gone over to using two-component clearcoats based on polyisocyanates for refinishing. These clearcoats are cured at room temperature or at temperatures not exceeding 80° C.

When the coating compositions disclosed in EP-A-137,256 are used for the preparation of the basecoat, color differences appear between the original finish baked at 140° C. and the refinish carried out using the two-component clearcoats.

The object of the present invention was to make available coating compositions for the preparation of the basecoat for two-coat coatings of the basecoat/clearcoat type which would be free from the shortcomings referred to above.

Surprisingly, this object is achieved by the coating compositions according to the main concept of the principal claim which comprise at least one resin containing urethane and urea groups, which resin is obtainable by reacting a1) a compound having two hydroxyl groups reactive toward isocyanate groups, with a2) an aliphatic and/or cycloaliphatic di-isocyanate to form a prepolymer (A) containing isocyanate groups, and by subsequently reacting the isocyanate groups of the prepolymer (A), at least in part, with p1 a3) an adduct produced from a (meth)acrylic ester, preferably an acrylic ester, and an aliphatic or cycloaliphatic compound containing at least two aminic hydrogen atoms, the adduct containing at least one active aminic hydrogen atom.

The benefits achieved by the invention consist essentially in the absence of any color differences between the original finish and the refinish when the coating compositions according to the invention are used. A further important benefit is that the resins containing urethane and urea groups, used in the basecoat compositions according to the invention, may be prepared by using an a3) component containing hydroxyl groups and then converted to satisfactory basecoats even without the addition of polyol components. It is furthermore possible to incorporate in the resin molecule hard polyester segments without producing incompatibility phenomena when aminoplast resins are added.

Apart from these benefits, the coating compositions according to the invention also possess the advantages of the coating compositions disclosed in EP-A-137,256.

The resins containing urethane and urea groups, contained in the coating compositions according to the invention, are obtainable by reacting a1) a compound having two hydroxyl groups reactive toward isocyanate groups, with a2) an aliphatic and/or cycloaliphatic di-isocyanate to form a prepolymer (A) containing isocyanate groups, and by subsequently reacting the isocyanate groups of the prepolymer (A), at least in part, with a3) an adduct produced from a (meth)acrylic ester, preferably an acrylic ester, and an aliphatic or cycloaliphatic compound containing at least two aminic hydrogen atoms, the adduct containing at least one active aminic hydrogen atom.

Any diol which is suitable for the preparation of polyurethane paint resins, may in principle be used as the component a1). These diols may be low-molecular, but diols with a higher molecular weight may also be used. Examples of low-molecular diols are ethylene glycol, propylene glycol, diethylene glycol, dipropylene glycol, butane diol, neopentyl glycol and hexane-1,6-diol.

Examples of diols with a higher molecular weight are polyether diols and polyester diols.

Suitable polyether diols are poly(oxyalkylene) diols such as, for example, poly(oxytetramethylene) glycol, poly(oxyethylene) glycol, poly(oxypropylene) glycol etc.

Polyester diols are preferably used as the component a1). These polyester diols are obtainable by esterifying organic dicarboxylic acids or their anhydrides with organic diols. Diols which are customarily used for the preparation of these polyesters, comprise alkylene glycols such as ethylene glycol, propylene glycol, butylene glycol, hexylene glycol, and neopentyl glycol, as well as other glycols, such as hydrogenated bisphenol-A, cyclohexanedimethanol, caprolactone diol (for example the reaction product of ϵ-caprolactone and ethylene glycol), hydroxyalkylated bisphenols, polyether glycols, for example poly(oxytetramethylene)glycol and the like. Other diols may, however, also be used.

The acid component of the polyester diols usually consists of dicarboxylic acids or their anhydrides having 2 to 18 carbons atoms per molecule. Examples of suitable acids are phthalic acid, isophthalic acid, terephthalic acid, tetrahydrophthalic acid, hexahydrophthalic acid, adipic acid, azelaic acid, sebacic acid, maleic acid, glutaric acid, hexachloroheptenedicarboxylic acid, tetrachlorophthalic acid and other dicarboxylic acids of various types. The corresponding anhydrides may of course also be used in place of the acids.

Those polyester diols which contain isphthalic acid as the acid component and have an average molecular weight (number average) of 400 to 2,000, are particularly preferred as the component a1).

Mixtures of various diols—for example mixtures of a polyester diol and a low-molecular diol—may of course also be used as the component a1).

Any aliphatic and/or cycloaliphatic diisocyanate which is suitable for the preparation of polyurethane paint resins, may in principle be used as the component a2). There are many such di-isocyanates. Examples of suitable di-isocyanates are 1,4-tetramethylenedi-isocyanate, hexamethylenedi-isocyanate, 2,2,4-trimethylhexane-1,6-di-isocyanate, isophoronedi-isocyanate, bis-(isocyanatocyclohexyl)methane and methyl-cyclohexyldi-isocyanate.

Mixtures of various di-isocyanates may of course also be used.

Adducts produced from (meth)acrylic esters and aliphatic and/or cycloaliphatic compounds containing at least two aminic hydrogen atoms, are used as the component a3). These adducts must contain at least one aminic hydrogen atom reactive toward isocyanate groups (a so-called active aminic hydrogen atom). The number of the active aminic hydrogen atoms must be selected so that no crosslinked resins are obtained. Adducts with 1 to 3 active aminic hydrogen atoms are in general used as the component a3). Adducts with two active aminic hydrogen atoms are preferably used.

The preparation of the adducts employed as the component a3) is carried out in a simple manner by reacting an aliphatic and/or cycloaliphatic compound containing at least two aminic hydrogen atoms, with (meth)acrylic esters. The addition reaction may be preformed in the molten state or in solution at temperatures between 20° and 120° C., preferably below 50° C. The reaction is in the majority of cases exothermic. The adducts used as the component a3) are advantagously prepared by dissolving the compound containing at least two aminic hydrogen atoms in a suitable solvent and gradually adding the (meth)acrylic ester with stirring at such a rate that the reaction temperature does not exceed 50° C.

Methacrylic esters as well as acrylic esters may be used for the preparation of the component a3). Acrylic esters are preferably used. Examples of suitable (meth)acrylic esters are ethyl(meth)acryliate, methyl(meth)acrylate, propyl(meth)acrylate, butyl(meth)acrylate and 2-ethylhexyl(meth)acrylate.

(Meth)acrylate esters containing hydroxyl groups, particularly alkyl(meth)acrylates containing hydroxyl groups, are preferably used. Alkyl (meth)acrylates containing hydroxyl groups whose alcoholic component has at least 4 carbon atoms, are most particularly preferred. Examples of suitable alkyl(meth)acrylates containing hydroxyl groups are 2-hydroxyethyl (meth)acrylate, 2-hydroxypropyl (meth)acrylate and 4-hydroxybutyl (meth)acrylate as well as in particular a reaction product of one mol of a hydroxyalkyl (meth)acrylate, preferably a hydroxyalkyl acrylate, particularly hydroxyethyl acrylate, with 1 to 3, preferably 2 mol of ϵ-caprolactone.

The component a3) is prepared by reacting the (meth)acrylate esters described above with a compound containing at least two aminic hydrogen atoms. To this purpose the reaction conditions and the type and amount of the compound containing at least two aminic hydrogen atoms must be so selected that the resultant adduct contains at least one, preferably 1 to 3 active aminic hydrogen atoms.

Suitable compounds containing at least two aminic hydrogen atoms are, for example, ethylenediamine, 1,2- or 1,3-propylenediamine, 1,6-hexanediamine, 2-methyl-1,6-hexanediamine, 1-methyl-2,4-diaminocyclohexane, 1-amino-3-aminomethyl-3,5,5-trimethylcyclohexane, 1,3- or 1,4-bisaminomethyl-cyclohexane or 4,4'-diaminodicyclohexylmethane. Compounds which contain primary amino groups, are preferred.

The resin containing urethane and urea groups, contained in the coating compositions according to the invention, is advantageously prepared by first reacting the components a1) and a2) to form a prepolymer (A) containing isocyanate groups. This reaction may be carried out by wellknown methods of polyurethane chemistry. The reaction between the components a1) and a2) is preferably carried out in an inert organic solvent (for example toluene, xylene, ethyl acetate or butyl acetate). In addition, the amounts of the components a1) and a2) chosen for the reaction are preferably such that the molar ratio of a1) to a2) is 0.5:1.0 to 0.9:1.0.

The adduct a3) is prepared in a separate reaction vessel in the manner described above. The final preparation of the resin according to the invention may be then carried out by a slow addition of the prepolymer (A) to the adduct a3). The proportion of the amount of prepolymer (A) to that of the component a3) is preferably so chosen that 1 to 2 active aminic hydrogen atoms are present per one isocyanate group.

A coating composition which is suitable as a basecoat composition for basecoat/clearcoat coatings, may be prepared from the resin containing urethane and urea groups according to the invention, described above, by generally known methods. The coating compositions according to the invention contain in addition to the resin according to the invention customary organic diluents, other resins where appropriate, pigments and other conventional additives in common use.

The organic diluents contained in the coating compositions according to the invention can consist of volatile organic liquids or mixtures of liquids, normally employed in coating compositions as polymer solvents or polymer dispersants.

Suitable examples of these are: aliphatic hydrocarbons, for example hexane and heptane, aromatic hydrocarbons, such as, for example, toluene and xylene, and petroleum fractions with various ranges of boiling points, which are mainly aliphatic but may also comprise a substantial aromatic content, esters, for example butyl acetate, ethylene glycol diacetate and 2-ethoxyethyl acetate, ketones, for example acetone and methyl isobutyl ketone, and alcohols, for example butyl alcohol.

Examples of resins which may be contained in the coating compositions according to the invention in addition to the resin according to the invention, are polyesters described in EP-A-137,256.

The coating compositions according to the invention advantageously contain a crosslinking agent. Suitable crosslinking agents are, for example, aminoplast resins, phenolic resins or blocked polyisocyanates. Aminoplast resins such as condensation products of formaldehyde with melamine, urea or benzoguanamine, are preferred. These aminoplast resins frequently contain methylol groups or similar alkylol groups which are preferably at least partly etherified with an alcohol.

The coating compositions according to the invention preferably contain 40 to 80% by weight, particularly preferably 55 to 65% by weight, based on the binder solids, of the resin according to the invention containing urethane and urea groups.

The coating compositions according to the invention may contain any pigment which is suitable for a basecoat/clearcoat coating. Coating compositions which contain metal platelet pigments, preferably aluminum platelets, either individually or in admixture, are particularly preferred. In addition to the metal platelet pigment, the preferred coating compositions may contain further colorant non-metallic pigments.

The coating compositions according to the invention may also contain further customary additives such as fillers, plasticizers, stabilizers, wetting agents, dispersants, flow-out agents, antifoams and catalysts either individually or in admixture in the customary amounts.

To improve further the metallic effect, crosslinked polymeric microparticles and/or a copolymer prepared from 85 to 95% by weight of ethylene and 15 to 5% by weight of vinyl acetate, may be added to the coating compositions according to the invention. Suitable polymeric microparticles are for example those described in EP 29,637 A2.

The invention further relates to a process for the preparation of a multicoat protective and/or decorative coating on a substrate surface in which
(1) a coating composition which comprises organic diluents, at least one resin containing urethane and urea groups, pigments and, where appropriate, other resins and other conventional additives in common use, is applied as basecoat composition,
(2) a polymeric film forms on the substrate surface from the coating composition applied in stage (1),
(3) a suitable transparent topcoat composition is applied to the basecoat obtained in this manner, and subsequently
(4) the basecoat and the topcoat are baked together,
wherein the basecoat composition comprises at least one resin containing urethane and urea groups, the resin being obtainable by reacting
a1) a compound having two hydroxy groups reactive toward isocyanate groups, with
a2) an aliphatic and/or cycloaliphatic di-isocyanate to form a prepolymer (A) containing isocyanate groups, and by subsequently reacting the isocyanate groups of the prepolymer (A), at least in part, with
a3) an adduct produced from a (meth)acrylic ester, preferably an acrylic ester, and an aliphatic or cycloaliphatic compound containing at least two aminic hydrogen atoms, the adduct containing at least one active aminic hydrogen atom.

In the first stage of the process according to the invention, a coating composition, as described above, is applied as basecoat composition. After a brief flash-off period, the resultant basecoat is overcoated by a transparent topcoat composition without a baking stage (wet-on-wet process). The basecoat and topcoat are finally baked together.

Basically any known non-pigmented or only transparently pigmented coating compositions are suitable as topcoat compositions. These may be conventional solvent-containing clearcoats, water-dilutable clearcoats or powder clearcoats.

Pretreated metal substrates are particularly suitable as the substrates to be coated, but non-pretreated metals and any other substrates, such as, for example, wood and plastics, may be coated by a basecoat/clearcoat coating by the process according to the invention.

The invention also relates to a substrate which has been coated by the process described above.

The invention also relates to resins containing urethane and urea groups which are obtainable by reacting
a1) a compound having two hydroxyl groups reactive toward isocyanate groups, with
a2) an aliphatic and/or cycloaliphatic diisocyanate to form a prepolymer (A) containing isocyanate groups, and by subsequently reacting the isocyanate groups of the prepolymer (A), at least in part, with
a3) an adduct produced from a (meth)acrylic ester, preferably an acrylic ester, and an aliphatic or cycloaliphatic compound containing at least two aminic hydrogen atoms, the adduct containing at least one active aminic hydrogen atom.

The invention is explained in further detail in the examples below. All parts and percentages are parts and percentages by weight, unless expressly stated otherwise.

1. Preparation of a Compound Comprising Two Hydroxyl Groups Reactive Toward Isocyanate Groups (Component a1)

1682 g of 2,2-dimethylpropane-1,3-diol, 472 g of adipic acid, 479 g of phthalicanhydride and 1074 g of isophthalic acid are weighed into a 6-liter four-necked flask provided with a stirrer, a thermometer, a packed column having a thermometer at its head, a distillation bridge, a descending condenser and a condensate receiver. The reaction mixture is first heated to 160° C. with stirring. After water has begun to split off, the temperature is so controlled that the temperature at the head of the column does not exceed 100° C. Esterification is continued at a temperature of 230° C. max., until the acid value is 5. The resultant polyester has a hydroxyl value of 118. The polyester is dissolved in butyl acetate to give an 80% solution.

2. Preparation of a Prepolymer (A) Containing Isocyanate Groups 1580 g of the polyester solution prepared according to the instructions under item 1, 17 g of 2,2-dimethylpropane-1,3-diol, 60 g of diethylene glycol and 72 g of butyl acetate are weighed into a four-necked flask provided with a stirrer, a thermometer and a reflux condenser, and the reaction mixture is heated to 60° C. 859 g of 4,4-dicyclohexylmethane di-isocyanate are then added in the course of 10 minutes. When the reaction mixture has become homogeneous, 0.8 g of dibutyltin dilaurate is added. The temperature is now increased to 100° C. and maintained for 3 hours. A prepolymer with an NCO content of 3.75% is obtained.

3. Preparation of Acrylic Ester—Amine Adducts (Component a3)

3.1 476 g of 4,4'-diamino-3,3-dimethyldicyclohexylmethane (Laromin C 260 ex BASF AG) is introduced in a two-liter vessel which can be cooled and which is provided with a stirrer, reflux condenser, a thermometer and an inlet vessel. 562 g of 4-hydroxybutyl acrylate are added from the inlet vessel in the course of 3 hours with stirring, during which time the reaction temperature is maintained below 50° C. by cooling. When the addition is completed, stirring is continued at room temperature. A faintly yellowish clear viscous liquid is obtained.

3.2 357 g of 4,4'-diamino-3,3'-dimethyldicyclohexylmethane (Laromin C 260 ex BASF AG) are introduced in the apparatus described in procedure 3.1. 903 g of a reaction product of one mol of hydroxyethyl acrylate with two mol of ε-caprolactone (Tone M-100 ex UCC) are added dropwise from the inlet vessel in the course of 3.5 hours with stirring. The reaction temperature is maintained below 50° C. by cooling. When the addition is completed, stirring is continued for 3 hours at room temperature. A faintly yellowish viscous liquid with an amine value of 131 is obtained.

3.3 The procedure 3.2 is followed, but instead of 903 g of Tome M-100, 516 g of Tone M-100 are added. The reaction product has an amine value of 191.

4. Preparation of Resins According to the Invention Containing Urethane and Urea Groups 4.1 A mixture consisting of 392 g of the adduct from procedure 3.1, 2077 g o butyl acetate and 744 g of n-butanol is prepared in a vessel provided with a stirrer. 1040 g of the prepolymer from procedure 2 are added to this mixture in the course of 20 minutes with stirring. An almost colorless solution is obtained with a solids content of 30% by weight and a viscosity of 3.4 dPas.

4.2 A mixture consisting of 189 g of the adduct from procedure 3.3, 1010 g of butyl acetate and 362 g of n-butanol is prepared in a vessel provided with a stirrer. 507 g of the prepolymer from procedure 2 are added to this mixture in the course of 20 minutes with stirring. An almost colorless solution is obtained with a solids content of 30% by weight and a viscosity of 4.0 dPas.

4.3 A mixture consisting of 343 g of the adduct from procedure 3.2, 1304 g of butyl acetate and 521 g of n-butanol is prepared in a vessel provided with a stirrer. 648 g of the prepolymer from procedure 2 are added to this mixture in the course of 20 minutes with stirring. A clear, colorless solution is obtained with a solids content of 30% and a viscosity of 3 dPas.

5. Preparation of Basecoat Compositions According to the Invention 23 parts of the copolymer dispersion described in Example D of EP-A-137,256 are blended with 47 parts of the resin solution prepared by procedures 4.1, 4.2 or 4.3 and with 13 parts of melamine resin etherified with butanol (Maprenal MF 650 ex Hoechst AG) to form a homogeneous mixture. Subsequently 5.5 parts of aluminum platelet pigment paste (65% in aliphatic hydrocarbons), triturated with 11.5 parts of butyl acetate, are incorporated in the above mixture. The viscosity of the resultant mixture is adjusted to 24 seconds (ISO 4) (spraying viscosity) with a mixture of 50 parts of butyl acetate, 25 parts of butylglycol acetate and 25 parts of n-butanol. The solids content of the basecoat compositions is 20% by weight.

6. Clearcoats Used for the Preparation of Two-Coat Coatings of the Basecoat/Clearcoat Type 6.1 Factory-finish clearcoat The clearcoat described in Examples K1 and K2 of EP-A-137,256 was used as the factory-finish clearcoat.

6.2 Refinish clearcoat

The composition described in Example K2 of EP-A-137,256 has been taken over except that instead of the melamine resin, 163 g of a hexamethylene diisocyanate trimerized via the biuret groups, marketed by Bayer AG under the trade name DESMODUR N, has been used. The solids content is 49.5%. This 2-component clearcoat has only a limited shelflife and should be used up soon after preparation.

7. Preparation of Two-Coat Coatings of the Basecoat/Clearcoat Type 7.1 Automotive body panels coated with a conventional primer and a filler coat are sprayed with the basecoat compositions prepared by procedure 5, using a flow-cup spraygun, in such a manner that a dry film thickness of the basecoat of 12 to 17 μm is obtained. After a flash-off period of 5 minutes, the sprayed basecoats are overcoated with the factory-finish clearcoat and the refinished clearcoat in such a manner that a dry film thickness of the clearcoat of 35 to 45 μm is obtained. After a flash-off period of 20 minutes, the coatings produced with the factory-finish clearcoat are baked for 20 minutes at 140° C. and those produced with the refinish clearcoat are baked for 20 minutes at 80° C.

7.2 (Comparison example)

The process described in procedure 7.1 is carried out, but the coating composition disclosed in Example 3 of EP-A-137,256 is used as the basecoat composition.

8. Assessment of the Two-Coat Coatings Prepared by Procedure 7

8.1 In order to assess the two-coat coatings prepared by procedure 7, the metallic effects of the coatings is measured and calculated in the following manner:

Instrument: goniophotometer GP2 (CARL ZEISS)

The measurement of the brightness viewed directly and viewed obliquely is carried out against a calibrated reference.

Measurement of the brightness viewed directly (BD):
Single-beam angle: −45°, aperture 0.25°
Observation angle: 38°, aperture 0.25°

Measurement of the brightness viewed obliquely (BO):
Single-beam angle: −70°, aperture 1°
Observation angle: 0°, aperture 2°

$$BD = \frac{RVS \times 62}{RVR}$$

$$BO = \frac{RVS \times 50}{RVR}$$

RVS = read-out value of sample

RVR = read-out value of reference

A marked metallic effect is observed when the BD value is high and the BO value is low. A measure of the metallic effect is obtained from the formula:

$$ME = \frac{BD}{BO} \times 100$$

8.2 Measurement results

|  | Factory-finish clearcoat | Refinish clearcoat |
|---|---|---|
| Basecoat composition 1 | 113* | 117* |
| Basecoat composition 2 | 129* | 125* |
| Basecoat composition 3 | 113* | 117* |
| Comparison example | 78* | 53* |

*ME values determined by procedure 8.1

The differences between the factory-finish coatings and the refinish coatings are distinctly less when the basecoat compositions according to the invention are used than when basecoat compositions according to EP-A-137,256 are used.

We claim:

1. A coating composition which is particularly suitable for the preparation of the basecoat for two-coat coatings of the basecoat/clearcoat type, and which comprises an organic diluent, at least one resin containing urethane and urea groups, and a metal pigment, which resin is obtainable by reacting
   a1) a compound having two hydroxyl groups reactive toward isocyanate groups, with
   a2) an aliphatic and/or cycloaliphatic di-isocyanate to form a prepolymer (A) containing isocyanate groups, and by subsequently reacting the isocyanate groups of the prepolymer (A), at least in part, with
   a3) an adduct produced from a (meth)acrylic ester or an acrylic ester, and an aliphatic or cycloaliphatic compound containing at least two aminic hydrogen atoms, the adduct containing at least one active aminic hydrogen atom.

2. A process for the preparation of a multicoat protective and/or decorative coating on a substrate surface comprising
   (1) applying a coating composition, which comprises an organic diluent, at least one resin containing urethane and urea groups and a metal pigment, as a basecoat composition,
   (2) forming a polymeric film on the substrate surface from the coating composition applied in stage (1),
   (3) applying a suitable transparent topcoat composition to the basecoat obtained in this manner, and subsequently
   (4) baking the basecoat and the topcoat together,
wherein the basecoat composition comprises at least one resin containing urethane and urea groups, the resin being obtainable by reacting
   a1) a compound having two hydroxyl groups reactive toward isocyanate groups, with
   a2) an aliphatic and/or cycloaliphatic di-isocyanate to form a prepolymer (A) containing isocyanate groups, and by subsequently reacting the isocyanate groups of the prepolymer (A), at least in part, with
   a3) an adduct produced from a (meth)acrylic ester or an acrylic ester, and an aliphatic or cycloaliphatic compound containing at least two aminic hydrogen atoms, the adduct containing at least one active aminic hydrogen atom.

3. A coating composition as claimed in claim 1, in which a polyester diol, prepared from isophthalic acid, having an average molecular weight (number average) of 400 to 2,000, is used as the component a1).

4. A coating composition as claimed in claim 1, in which the components a1) and a2) are used in a molar ratio of 0.5:1.0 to 0.9:1.0.

5. A coating composition according to claim 1, in which the adduct used as component a3) contains an average of about two active aminic hydrogen atoms per molecule.

6. A coating composition according to claim 1, in which the metal pigment is a metallic platelet pigment.

7. A substrate coated with a multicoat protective and/or decorative coating, which has been prepared by the process of claim 2.

8. A resin containing urethane and urea groups and a metal pigment, which resin is obtainable by reacting
   a1) a compound having two hydroxyl groups reactive toward isocyanate groups, with
   a2) an aliphatic and/or cycloaliphatic di-isocyanate to form a prepolymer (A) containing isocyanate groups, and by subsequently reacting the isocyanate groups of the prepolymer (A), at least in part, with
   a3) an adduct produced from a (meth)acrylic ester or an acrylic ester, and an aliphatic or cycloaliphatic compound containing at least two aminic hydrogen atoms, the adduct containing at least one active aminic hydrogen atom.

9. A process for the preparation of a resin containing urethane and urea groups and a metal pigment, which resin is obtainable by reacting
   a1) a compound having two hydroxyl groups reactive toward isocyanate groups is reacted with
   a2) an aliphatic and/or cycloaliphatic di-isocyanate to form a prepolymer (A) containing isocyanate groups, and by subsequently reacting the isocyanate groups of the prepolymer (A), at least in part, with
   a3) an adduct produced from a (meth)acrylic ester or an acrylic ester, and an aliphatic or cycloaliphatic compound containing at least two aminic hydrogen atoms, the adduct containing at least one active aminic hydrogen atom.

10. A process as claimed in claim 2, in which a polyester diol, prepared from isophthalic acid, having an average molecular weight (number average) of 400 to 2,000, is used as the component a1).

11. A process as claimed in claim 2, in which the components a1) and a2) are used in a molar ratio of 0.5:1.0 to 0.9:1.0.

12. A process according to claim 2, in which the adduct used as component a3) contains an average of about two active aminic hydrogen atoms per molecule.

13. A process according to claim 2, in which the metal pigment is a metallic platelet pigment.

* * * * *

UNITED STATES PATENT AND TRADEMARK OFFICE
CERTIFICATE OF CORRECTION

PATENT NO. : 5,169,922
DATED : December 8, 1992
INVENTOR(S) : Hille et al.

It is certified that error appears in the above-identified patent and that said Letters Patent is hereby corrected as shown below:

Column 2, line 13, change "with $_p$1 a3)" to --with a3)--;

Column 3, line 18, change "isphthalic" to --isophthalic--.

Column 3, line 63, change "(meth" to --(meth)--.

Column 4, line 64, change ")acrylic" to --acrylic--.

Signed and Sealed this

Thirtieth Day of November, 1993

Attest:

BRUCE LEHMAN

Attesting Officer

Commissioner of Patents and Trademarks